(12) United States Patent
Huschke et al.

(10) Patent No.: US 12,640,855 B2
(45) Date of Patent: May 26, 2026

(54) HYBRID AUTOMATIC REPEAT REQUEST (HARQ) FEEDBACK EN-/DISABLING FOR MULTICAST

(71) Applicant: Telefonaktiebolaget LM Ericsson (publ), Stockholm (SE)

(72) Inventors: Jörg Huschke, Cologne (DE); Erik Stare, Sollentuna (SE); Florent Munier, Västra Frölunda (SE); Rui Fan, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 266 days.

(21) Appl. No.: 18/261,926

(22) PCT Filed: Jan. 18, 2022

(86) PCT No.: PCT/EP2022/051039
§ 371 (c)(1),
(2) Date: Jul. 18, 2023

(87) PCT Pub. No.: WO2022/152944
PCT Pub. Date: Jul. 21, 2022

(65) Prior Publication Data
US 2024/0305417 A1       Sep. 12, 2024

(30) Foreign Application Priority Data
Jan. 18, 2021    (WO) ................ PCT/CN2021/072497

(51) Int. Cl.
*H04L 1/1867*       (2023.01)
*H04L 5/00*       (2006.01)

(52) U.S. Cl.
CPC .......... *H04L 1/1896* (2013.01); *H04L 5/0005* (2013.01); *H04L 5/0055* (2013.01)

(58) Field of Classification Search
CPC ... H04L 1/1896; H04L 5/0005; H04L 5/0055; H04L 1/1825; H04L 1/1854
(Continued)

(56) References Cited

U.S. PATENT DOCUMENTS

2018/0049060 A1*   2/2018   Fujishiro ............... H04W 72/30

FOREIGN PATENT DOCUMENTS

WO       2021133238 A1       7/2021
WO       2022001790 A1       1/2022

OTHER PUBLICATIONS

Over Intel Corporation, "Mechanisms to Improve Reliability of NR MBS", R1-2009001, Oct. 26-Nov. 13, 2020. (From Applicant's IDS) (Year: 2020).*
(Continued)

*Primary Examiner* — Mang Hang Yeung
(74) *Attorney, Agent, or Firm* — Weisberg I.P. Law, P.A.

(57)       ABSTRACT
A method, apparatus, and system are provided for HARQ feedback en-/disabling for multicast. In one embodiment, a network node is configured to communicate with at least a first wireless device. The network node includes processing circuitry configured to determine a Hybrid Automatic Repeat reQuest, HARQ, feedback mode of a plurality of HARQ feedback modes for the first wireless device to implement where each of the plurality of HARQ feedback modes is different from each other, and cause transmission of radio resource control, RRC, signaling to indicate for the first wireless device to implement the determined HARQ feedback mode of the plurality of feedback modes.

16 Claims, 8 Drawing Sheets

Determine a Hybrid Automatic Repeat reQuest, HARQ, feedback mode for a wireless device, WD, from a plurality of HARQ feedback modes
S134

Send a configuration to the WD, the configuration indicating the determined HARQ feedback mode for the WD from the plurality of HARQ feedback modes
S136

(58) Field of Classification Search
USPC ......................................................... 370/329
See application file for complete search history.

(56) References Cited

OTHER PUBLICATIONS

International Search Report and Written Opinion dated Apr. 28, 2022 for International Application No. PCT/EP2022/051039 filed Jan. 18, 2022, consisting of 13-pages.
3GPP TS 38.213 V16.3.0; 3rd Generation Partnership Project; Technical Specification Group Radio Access Network; NR; Physical layer procedures for control (Release 16); Sep. 2020, consisting of 179-pages.
E. Dahlman et al.; 5G NR: The Next Generation Wireless Access Technology; Elsevier; 2018; consisting of 4-pages.
3GPP TSG RAN WG1 #103-e R1-2009001; Title: Mechanisms to Improve Reliability of NR MBS; Agenda Item: 8.12.2; Source: Intel Corporation; Document for: Discussion and Decision; Date and Location: Oct. 26-Nov. 13, 2020, e-Meeting, consisting of 5-pages.

* cited by examiner

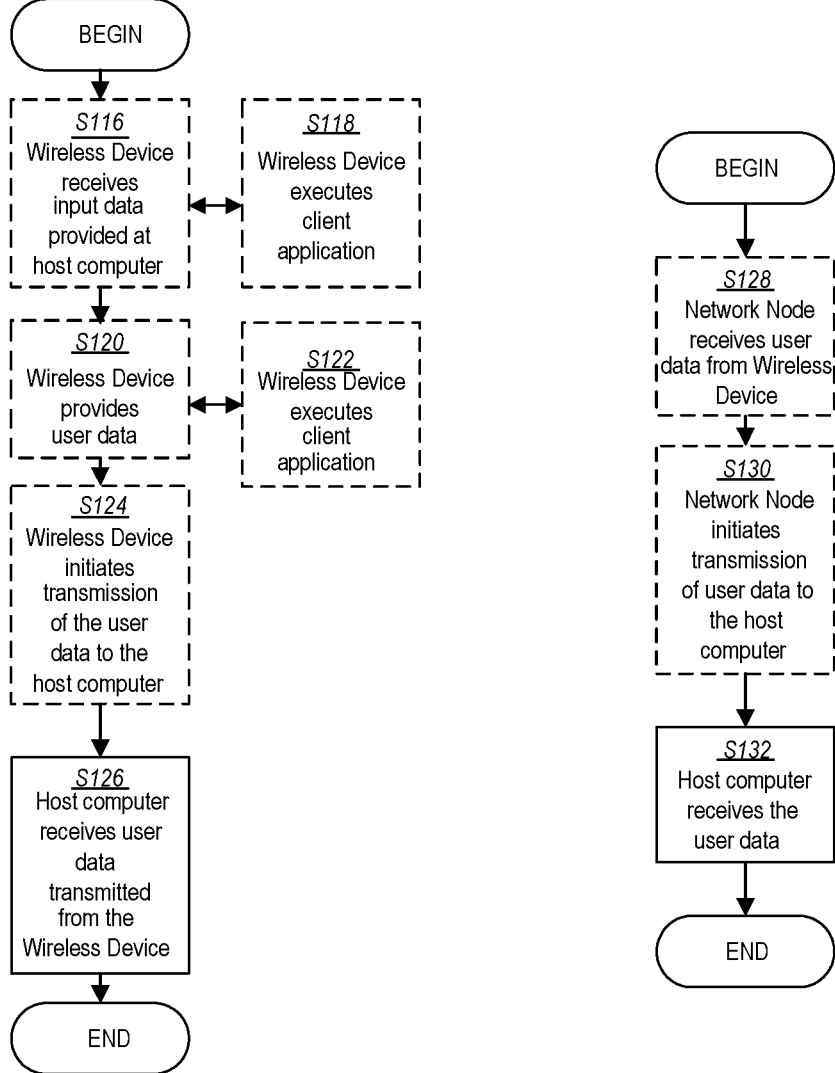
FIG. 7                          FIG. 8

HYBRID AUTOMATIC REPEAT REQUEST (HARQ) FEEDBACK EN-/DISABLING FOR MULTICAST

CROSS-REFERENCE TO RELATED APPLICATIONS

This application is a Submission Under 35 U.S.C. § 371 for U.S. National Stage Patent Application of International Application No.: PCT/EP2022/051039, filed Jan. 18, 2022 entitled "HYBRID AUTOMATIC REPEAT REQUEST (HARQ) FEEDBACK EN-/DISABLING FOR MULTI-CAST," which claims priority to Chinese Application No.: PCT/CN2021/072497, filed Jan. 18, 2021, the entireties of both of which are incorporated herein by reference.

TECHNICAL FIELD

The present disclosure relates to wireless communications and, in particular, to Hybrid Automatic Repeat reQuest (HARQ) feedback en-/disabling for multicast.

BACKGROUND

In 3rd Generation Partnership Project (3GPP) New Radio (NR, also called 5G or $5^{th}$ Generation) networks, an adaptive retransmission scheme called Hybrid Automatic Repeat reQuest (HARQ) is widely used. According to this scheme, the receiver of a packet sends back a positive (ACK) or a negative (NACK) acknowledgement to the sender, depending on whether the receiver has decoded the transport block successfully or unsuccessfully, respectively. If the acknowledgement is an ACK, the sender will transmit a new transport block, and if it is a NACK the sender will retransmit either the same version or a different version of the initial transport block. There can be multiple retransmission attempts for a single data transport block. Typically, the HARQ is most suitable for unicast and groupcast transmissions because these casting modes often have ways of identifying the source and the destination of a transport block (e.g., source and destination identifiers (IDs)), which facilitates both the feedbacks and data retransmissions. HARQ is often not used in broadcast mode where either feedback and retransmission are not of interest or their benefits do not outweigh the associated complexity due to many participants. Multicast in the downlink (DL) from a network node (e.g., gNB) to a group of WDs is considered. The term multicast and Point-To-Multipoint (PTM) are used herein, interchangeably.

The actual time-frequency resource that a WD may use for HARQ feedback is determined as outlined in the following:

In a downlink control information (DCI), a PDSCH-to-HARQ_feedback timing indicator is contained that points to an element of a radio resource control (RRC) configurable list of timing for given physical downlink shared channel (PDSCH) to the DL ACK (see e.g., 3GPP Technical Specification (TS) 38.213, clause 9.1.2) contained in Information Element (IE) dl-DataToUL-ACK as in illustrated in FIG. 1. The unit of the timings is a slot.

Within the so defined slot, the time-frequency-code resource in terms of orthogonal frequency division multiplexing (OFDM) symbols, physical resource blocks (PRBs) and possibly an orthogonal code is determined by a combination of the 3 bit physical uplink control channel (PUCCH) Resource Indicator (PRI) in the DCI and RRC-configured PUCCH resources sets, as illustrated in FIG. 2, where acknowledgement resource indicator (ARI) stands for the standardized PRI.

Which PUCCH resource set is used is determined from the uplink control information (UCI) payload information in number of bits as indicated by the x-axis. A PUCCH resource set typically includes at least four PUCCH resource configurations, where each resource configuration contains the PUCCH format to use and all the parameters necessary for that format.

The PUCCH configurations may be regarded as candidates for a WD, and the network node (e.g., gNB) can dynamically address the candidates in each DCI. However, not all WDs are always scheduled: thus, for every uplink slot the network node can dynamically assign a PUCCH configuration for those WDs that have actually a need, e.g., because the network node has scheduled, using the DCI, data on the physical downlink shared channel (PDSCH) before and the WD therefore may be required to transmit ACK/NACK (A/N).

SUMMARY

Some embodiments of the present disclosure advantageously provide methods, apparatuses and systems for HARQ feedback en-/disabling for multicast.

In one embodiment, a network node is configured to determine a Hybrid Automatic Repeat reQuest, HARQ, feedback mode for a wireless device, WD from a plurality of HARQ feedback modes; and send a configuration to the WD, the configuration indicating the determined HARQ feedback mode for the WD from the plurality of HARQ feedback modes.

In one embodiment, a wireless device is configured to receive a configuration; and determine a Hybrid Automatic Repeat reQuest, HARQ, feedback mode for the WD from a plurality of HARQ feedback modes based on the received configuration.

According to one aspect of the present disclosure, a network node configured to communicate with at least a first wireless device is provided. The network node includes processing circuitry configured to: determine a Hybrid Automatic Repeat reQuest, HARQ, feedback mode of a plurality of HARQ feedback modes for the first wireless device to implement where each of the plurality of HARQ feedback modes are different from each other, and cause transmission of radio resource control, RRC, signaling to indicate for the first wireless device to implement the determined HARQ feedback mode of the plurality of feedback modes.

According to one or more embodiments of this aspect, the plurality of HARQ feedback modes include: a first HARQ feedback mode that enables at least one of an acknowledgement, ACK, and a non-acknowledgment, NACK; and a second HARQ feedback mode that disables one of the ACK and NACK. According to one or more embodiments of this aspect, the plurality of HARQ feedback modes include a third HARQ feedback mode that disables both the ACK and NACK. According to one or more embodiments of this aspect, the processing circuitry is further configured to cause transmission to a plurality of point-to-multipoint, PTM, groups, a first PTM group and a second PTM group of the plurality of PTM groups being associated with the first wireless device, and where the RRC signaling indicates that the determined HARQ feedback mode for the first wireless device is to be implemented by the first wireless device for the first PTM group and not the second PTM group.

According to one or more embodiments of this aspect, each PTM group of the plurality of PTM groups are associated with a different group-radio network temporary identifier, G-RNTI. According to one or more embodiments of this aspect, the network node is further configured to communicate with a plurality of wireless devices that include the first wireless device, and where the processing circuitry is configured to cause transmission to a plurality of point-to-multipoint, PTM, groups associated with the plurality of wireless devices, and where the RRC signaling indicates for a subset of the plurality of wireless device to implement the determined HARQ feedback mode of the plurality of feedback modes. According to one or more embodiments of this aspect, the determined HARQ feedback mode of the plurality of HARQ feedback modes disables a non-acknowledgement, NACK, and enables an acknowledgement, ACK.

According to one or more embodiments of this aspect, the network node is further configured to communicate with a plurality of wireless devices that include the first wireless device. The network node includes processing circuitry that is further configured to determine a quantity of the plurality of wireless devices that are configured with a physical uplink control channel, PUCCH, configuration on a first time-frequency resource for transmitting HARQ feedback, determine whether the determined quantity of the plurality of wireless devices exceeds a threshold, and reconfigure a subset of the plurality of wireless devices with a PUCCH configuration on a second time-frequency resource different from the first time-frequency resource. According to one or more embodiments of this aspect, the RRC signaling is sent via downlink control information, DCI. According to one or more embodiments of this aspect, the processing circuitry is further configured to: cause transmission of a multicast physical downlink shared channel, PDSCH, to at least the first wireless device, and receive HARQ feedback on a first physical uplink control channel, PUCCH, resource of a plurality of PUCCH resources, the first PUCCH resource on which the HARQ feedback is received being based on the determined HARQ feedback mode.

According to another aspect of the present disclosure, a first wireless device configured to communicate with a network node is provided. The first wireless device includes processing circuitry configured to: receive radio resource control, RRC, signaling, determine a Hybrid Automatic Repeat reQuest, HARQ, feedback mode of a plurality of HARQ feedback modes based on the RRC signaling where each of the plurality of HARQ feedback modes is different from each other, and implement the determined HARQ feedback mode based on the determination.

According to one or more embodiments of this aspect, the plurality of HARQ feedback modes include: a first HARQ feedback mode that enables at least one of an acknowledgement, ACK, and a non-acknowledgment, NACK, and a second HARQ feedback mode that disables one of the ACK and NACK. According to one or more embodiments of this aspect, the plurality of HARQ feedback modes include a third HARQ feedback mode that disables both the ACK and NACK. According to one or more embodiments of this aspect, the first wireless device is registered with first and second point-to-multipoint, PTM, groups of a plurality of PTM groups, and where the RRC signaling indicates that the determined HARQ feedback mode of the plurality of HARQ feedback modes for the first wireless device is to be implemented for the first PTM group and not for a second PTM group.

According to one or more embodiments of this aspect, each PTM group of the plurality of PTM groups are associated with a different group-radio network temporary identifier, G-RNTI. According to one or more embodiments of this aspect, the RRC signaling is associated with a subset of a plurality of wireless devices that includes the first wireless device where the RRC signaling indicates for the subset of the plurality of wireless devices to implement the determined HARQ feedback mode. According to one or more embodiments of this aspect, the determined HARQ 10 feedback mode of the plurality of HARQ feedback modes disables a non-acknowledgement, NACK, and enables an acknowledgement, ACK.

According to one or more embodiments of this aspect, the RRC signaling is received via downlink control information, DCI. According to one or more embodiments of this aspect, the processing circuitry is further configured to receive a multicast physical downlink shared channel, PDSCH, and cause transmission of HARQ feedback on a first physical uplink control channel, PUCCH, resource of a plurality of PUCCH resources, the first PUCCH resource on which the HARQ feedback is received being based on the determined HARQ feedback mode.

According to another aspect of the present disclosure, a method implemented by a network node configured to communicate with at least a first wireless device is provided. A Hybrid Automatic Repeat reQuest, HARQ, feedback mode of a plurality of HARQ feedback modes for the first wireless device to implement is determined where each of the plurality of HARQ feedback modes is different from each other. Transmission is caused of radio resource control, RRC, signaling to indicate for the first wireless device to implement the determined HARQ feedback mode of the plurality of feedback modes.

According to one or more embodiments of this aspect, the plurality of HARQ feedback modes include a first HARQ feedback mode that enables at least one of an acknowledgement, ACK, and a non-acknowledgment, NACK, and a second HARQ feedback mode that disables one of the ACK and NACK. According to one or more embodiments of this aspect, the plurality of HARQ feedback modes include a third HARQ feedback mode that disables both the ACK and NACK. According to one or more embodiments of this aspect, transmission is caused to a plurality of point-to-multipoint, PTM, groups where a first PTM group and a second PTM group of the plurality of PTM groups are associated with the first wireless device. The RRC signaling indicates that the determined HARQ feedback mode for the first wireless device is to be implemented by the first wireless device for the first PTM group and not the second PTM group.

According to one or more embodiments of this aspect, each PTM group of the plurality of PTM groups are associated with a different group-radio network temporary identifier, G-RNTI. According to one or more embodiments of this aspect, the network node is further configured to communicate with a plurality of wireless devices that include the first wireless device. Transmission is caused to a plurality of point-to-multipoint, PTM, groups associated with the plurality of wireless devices. The RRC signaling indicates for a subset of the plurality of wireless device to implement the determined HARQ feedback mode of the plurality of feedback modes. According to one or more embodiments of this aspect, the determined HARQ feedback mode of the plurality of HARQ feedback modes disables a non-acknowledgement, NACK, and enables an acknowledgement, ACK.

According to one or more embodiments of this aspect, the network node is further configured to communicate with a plurality of wireless devices that include the first wireless device. A quantity of the plurality of wireless devices that are configured with a physical uplink control channel, PUCCH, configuration on a first time-frequency resource for transmitting HARQ feedback are determined. A determination is performed whether the determined quantity of the plurality of wireless devices exceeds a threshold. A subset of the plurality of wireless devices are configured with a PUCCH configuration on a second time-frequency resource different from the first time-frequency resource. According to one or more embodiments of this aspect, the RRC signaling is sent via downlink control information, DCI. According to one or more embodiments of this aspect, transmission of a multicast physical downlink shared channel, PDSCH, is caused to at least the first wireless device. HARQ feedback on a first physical uplink control channel, PUCCH, resource of a plurality of PUCCH resources is received where the first PUCCH resource on which the HARQ feedback is received being based on the determined HARQ feedback mode.

According to another aspect of the present disclosure, a method of a first wireless device configured to communicate with a network node is provided. Radio resource control, RRC, signaling is received. A Hybrid Automatic Repeat reQuest, HARQ, feedback mode of a plurality of HARQ feedback modes is determined based on the RRC signaling where each of the plurality of HARQ feedback modes is different from each other. The determined HARQ feedback mode is implemented based on the determination. According to one or more embodiments of this aspect, the plurality of HARQ feedback modes include a first HARQ feedback mode that enables at least one of an acknowledgement, ACK, and a non-acknowledgment, NACK, and a second HARQ feedback mode that disables one of the ACK and NACK. According to one or more embodiments of this aspect, the plurality of HARQ feedback modes include a third HARQ feedback mode that disables both the ACK and NACK.

According to one or more embodiments of this aspect, the first wireless device is registered with first and second point-to-multipoint, PTM, groups of a plurality of PTM groups where the RRC signaling indicates that the determined HARQ feedback mode of the plurality of HARQ feedback modes for the first wireless device is to be implemented for the first PTM group and not for a second PTM group. According to one or more embodiments of this aspect, each PTM group of the plurality of PTM groups are associated with a different group-radio network temporary identifier, G-RNTI. According to one or more embodiments of this aspect, the RRC signaling is associated with a subset of a plurality of wireless devices that includes the first wireless device where the RRC signaling indicates for the subset of the plurality of wireless devices to implement the determined HARQ feedback mode.

According to one or more embodiments of this aspect, the determined HARQ feedback mode of the plurality of HARQ feedback modes disables a non-acknowledgement, NACK, and enables an acknowledgement, ACK. According to one or more embodiments of this aspect, the RRC signaling is received via downlink control information, DCI. According to one or more embodiments of this aspect, a multicast physical downlink shared channel, PDSCH is received. Transmission is caused of HARQ feedback on a first physical uplink control channel, PUCCH, resource of a plurality of PUCCH resources, the first PUCCH resource on which the HARQ feedback is received being based on the determined HARQ feedback mode.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating example methods implemented in a communication system including a host computer, a network node and a wireless device for receiving user data from the wireless device at a host computer according to some embodiments of the present disclosure;

FIG. 8 is a flowchart illustrating example methods implemented in a communication system including a host computer, a network node and a wireless device for receiving user data at a host computer according to some embodiments of the present disclosure:

DETAILED DESCRIPTION

Figure 1:
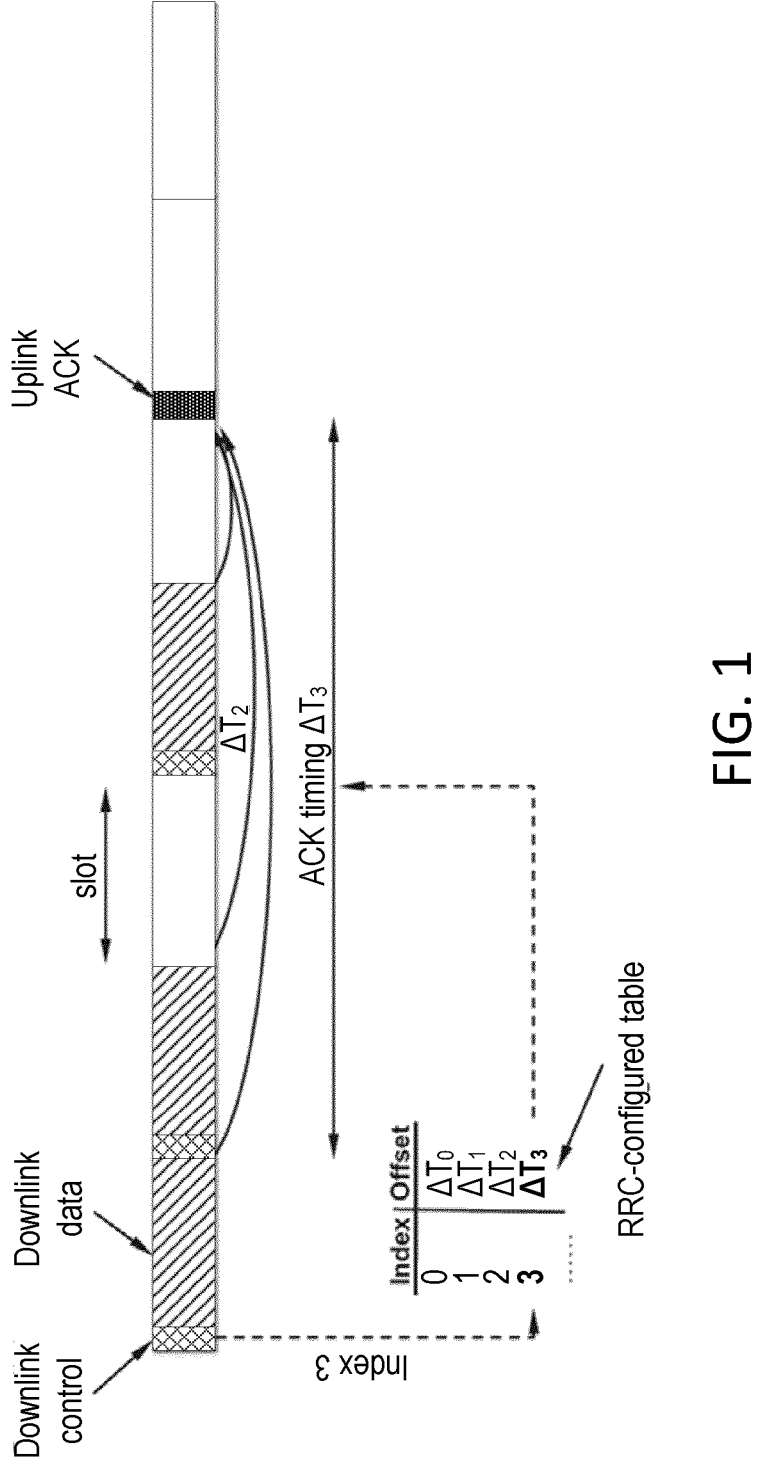
FIG. 1 is a schematic diagram illustrating an indicator in DCI pointing to an RRC configurable list.
Figure 2:
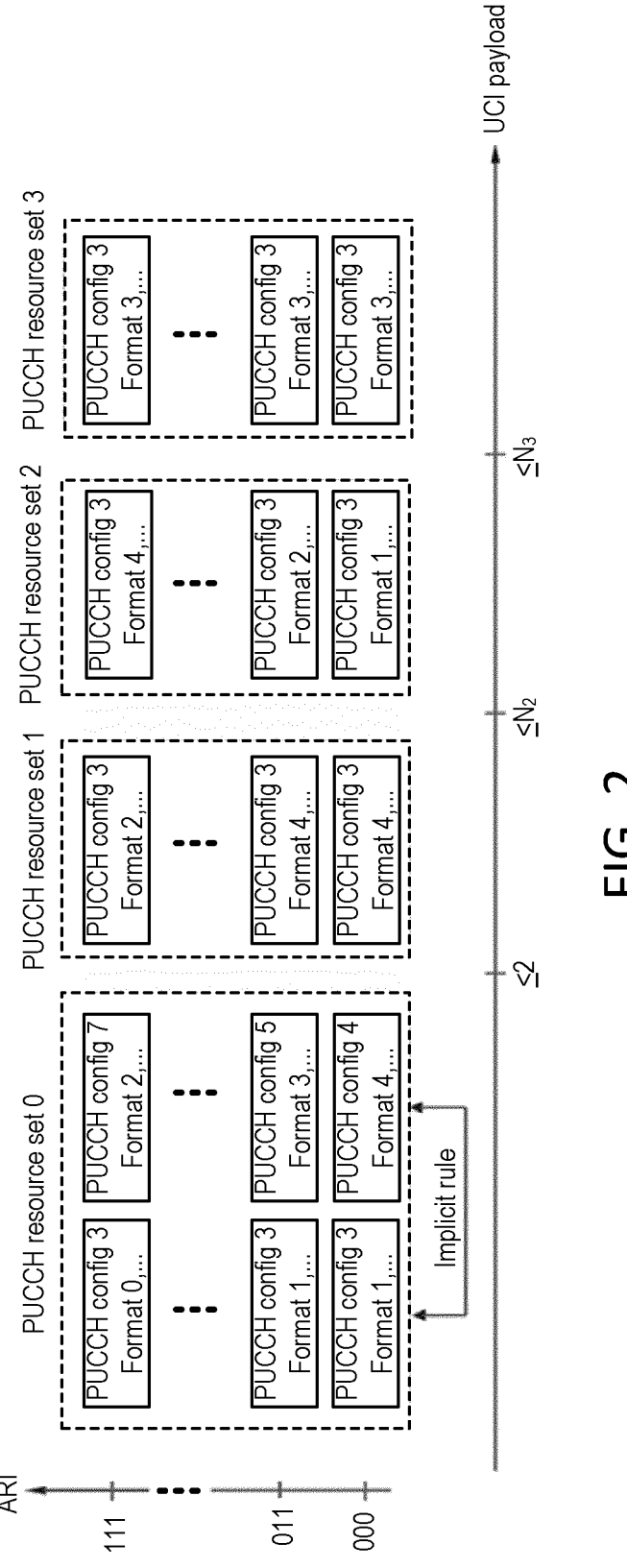
FIG. 2 is a schematic diagram illustrating an example time-frequency-code resource in terms of OFDM symbols, PRBs and possibly an orthogonal code as determined by a combination of the 3 bit PRI in the DCI and the RRC configured PUCCH resources sets.

Generally, each ACK/NACK (A/N) is transmitted from a WD on a PUCCH resource. Thereby, if all PTM WDs are to transmit A/N, then the amount of uplink resources to be used increases linearly with the number of WDs in the PTM group. For some use cases it may be desirable to support a very large number of WDs which is too costly in terms of PUCCH resources.

A known solution is to let PTM-WDs transmit only NACK and many or even all PTM-WDs use a common PUCCH resource for this. The drawbacks may include:

1) The network node cannot identify which WDs have transmitted NACK, only that at least one has done so. This makes it impossible for the network node to adapt the transmission parameters of the retransmission for specific WD, which would be more spectrally efficient or more reliable.

2) A WD may not have received the PDCCH scheduling a PDSCH and then it will not even try to decode the PDSCH, thus not send NACK, so the network node will falsely assume the WD has received the PDSCH.

3) The NACK transmission power from all WDs in the common PUCCH resource aggregates, which can cause a kind of power surge that can cause excessive intra- and/or inter-cell uplink interference. Since the network node does not know in advance which and how many WDs transmit a NACK in a PUCCH resource, it cannot control the resulting aggregate power.

A solution for the PUCCH resource limitations includes en/disabling ACK and/or NACK for all PTM-WDs, using bits in the DCI or specific radio network temporary identifiers (RNTIs).

A problem with known existing solutions is that they do not handle the A/N feedback configuration WD specifically, i.e., do not combine different feedback modes, including no feedback, for different WDs.

Some embodiments provided herein include switching individual WDs between A/N and NACK-only mode, so that only a configured number of WDs is in the A/N mode concurrently, and the configuration of the PUCCH resources ensure that the configured number is always sufficient.

Some embodiments advantageously maintain improved feedback information from a group of WDs even under uplink resource restrictions. Improved feedback may allow for more reliable and efficient retransmission.

Some embodiments advantageously provide that, when WDs in disabled state use NACK-only feedback, there is no urgency of enabling the WD to the enabled state, because each WD can still transmit NACK and the event that the WD will not have received PDCCH is less probable than that it has not received the PDSCH.

Some embodiments may advantageously provide that with NACK-only used only for WDs in good reception conditions there may be no power aggregation problem (or it may be reduced), since NACKs for such WDs are rare; thus, it is even more rare that many WDs transmit NACK for the same transport block.

Before describing in detail example embodiments, it is noted that the embodiments reside primarily in combinations of apparatus components and processing steps related to HARQ feedback en-/disabling for multicast. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrow band IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Generally, it may be considered that the network, e.g., a signaling radio node and/or node arrangement (e.g., network node), configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g., information or payload bits, or total number of bits. The set of resources, and/or the resources of the sets, may pertain to the same carrier and/or bandwidth part, and/or may be located in the same slot, or in neighboring slots.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g., representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g., representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or gNodeB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Generally, configuring may include determining configuration data representing the configuration and providing, e.g., transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g., WD) may comprise scheduling downlink and/or uplink transmissions for the terminal, e.g., downlink data and/or downlink control signaling and/or DCI and/or uplink control or data or communication signaling, in particular acknowledgement signaling, and/or configuring resources and/or a resource pool therefor. In particular, configuring a terminal (e.g., WD) may comprise configuring the WD to perform certain measurements on certain subframes or radio resources and reporting such measurements according to embodiments of the present disclosure.

Predefined in the context of this disclosure may refer to the related information being defined for example in a standard, and/or being available without specific configuration from a network or network node, e.g., stored in memory, for example independent of being configured. Configured or configurable may be considered to pertain to the corresponding information being set/configured, e.g., by the network or a network node.

In some embodiments, a pointer may be considered one or more bits in a field in a message (e.g., one or more bits) that may point to, indicate and/or map to a list, table or the like that is configured or predefined at a WD.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for HARQ feedback en-/disabling for multicast.

Figure 3:
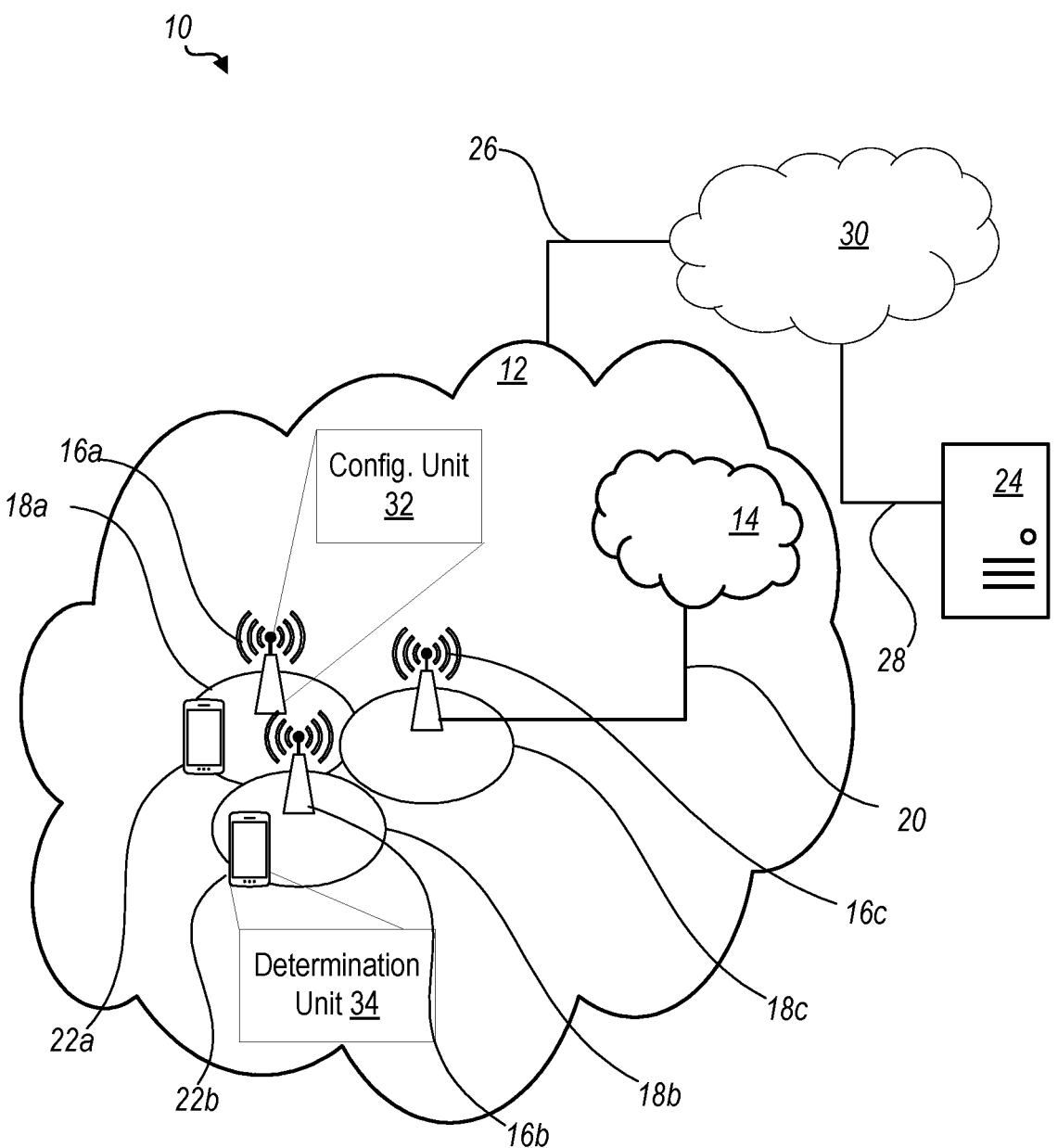
FIG. 3 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to determine a Hybrid Automatic Repeat reQuest, HARQ, feedback mode for a wireless device, WD from a plurality of HARQ feedback modes, and send a configuration to the WD, the configuration indicating the determined HARQ feedback mode for the WD from the plurality of HARQ feedback modes.

A wireless device 22 is configured to include a determination unit 34 which is configured to receive a configuration, and determine a Hybrid Automatic Repeat reQuest, HARQ, feedback mode for the WD from a plurality of HARQ feedback modes based on the received configuration.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform network node methods discussed herein, such as the methods discussed with reference to FIG. 9 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a determination unit 34 configured to perform WD methods discussed herein, such as the methods discussed with reference to FIG. 10 as well as other figures.

Figure 4:
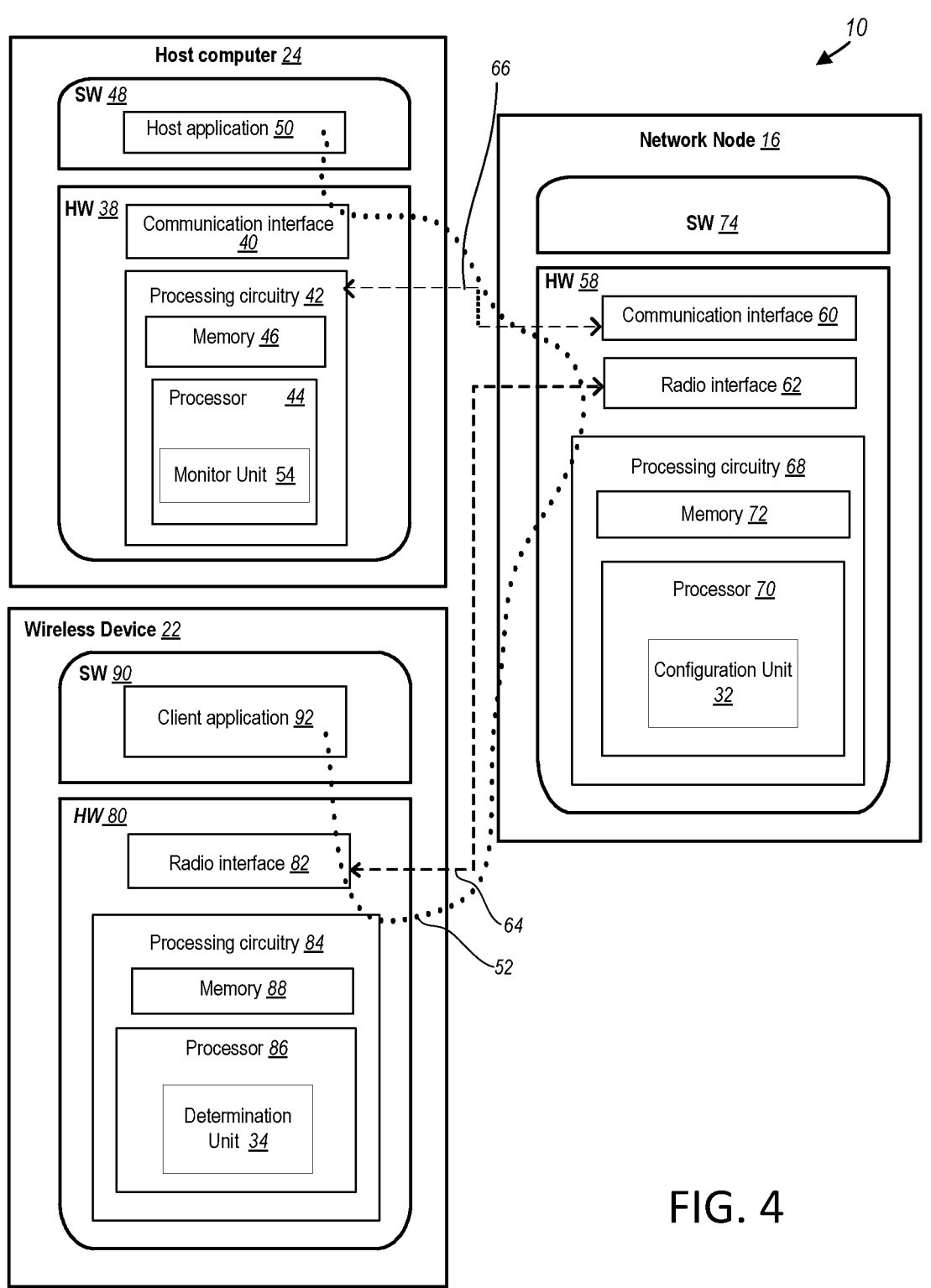
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes: the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as configuration unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 5, 6:
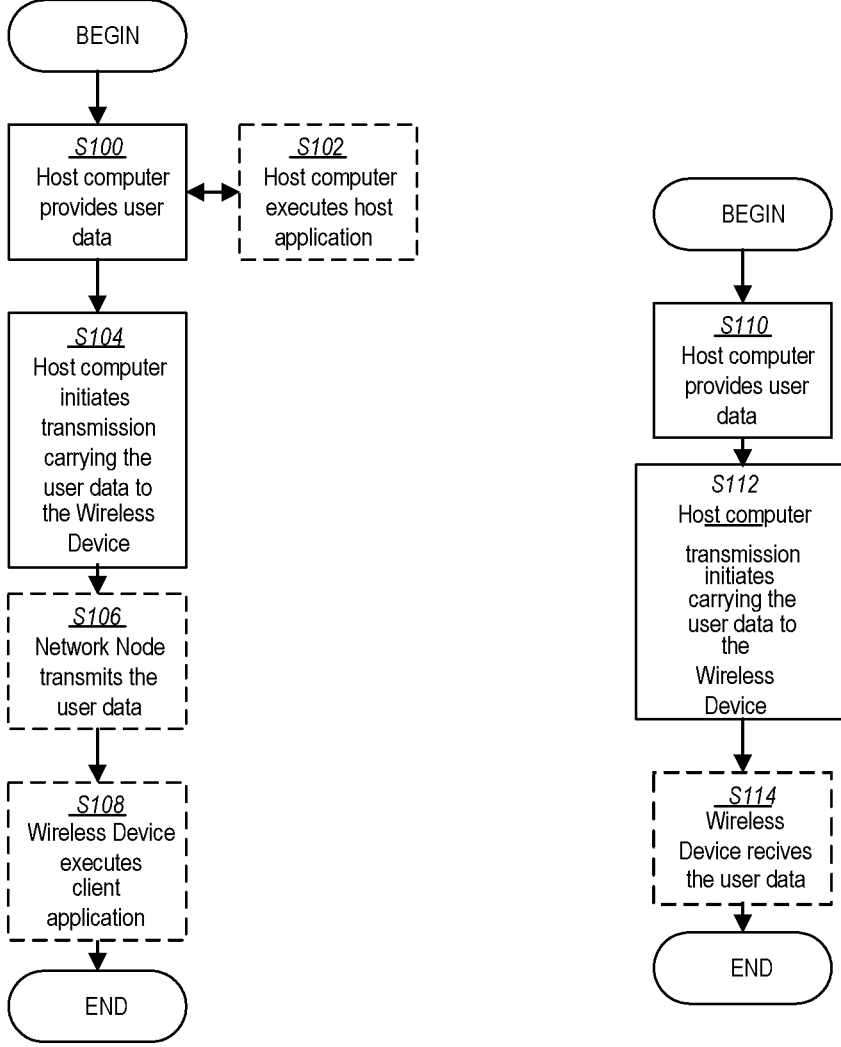
FIG. 5 is a flowchart illustrating example methods implemented in a communication system including a host computer, a network node and a wireless device for executing a client application at a wireless device according to some embodiments of the present disclosure.
FIG. 6 is a flowchart illustrating example methods implemented in a communication system including a host computer, a network node and a wireless device for receiving user data at a wireless device according to some embodiments of the present disclosure.

FIG. 5 is a flowchart illustrating an example method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figures 9, 10:
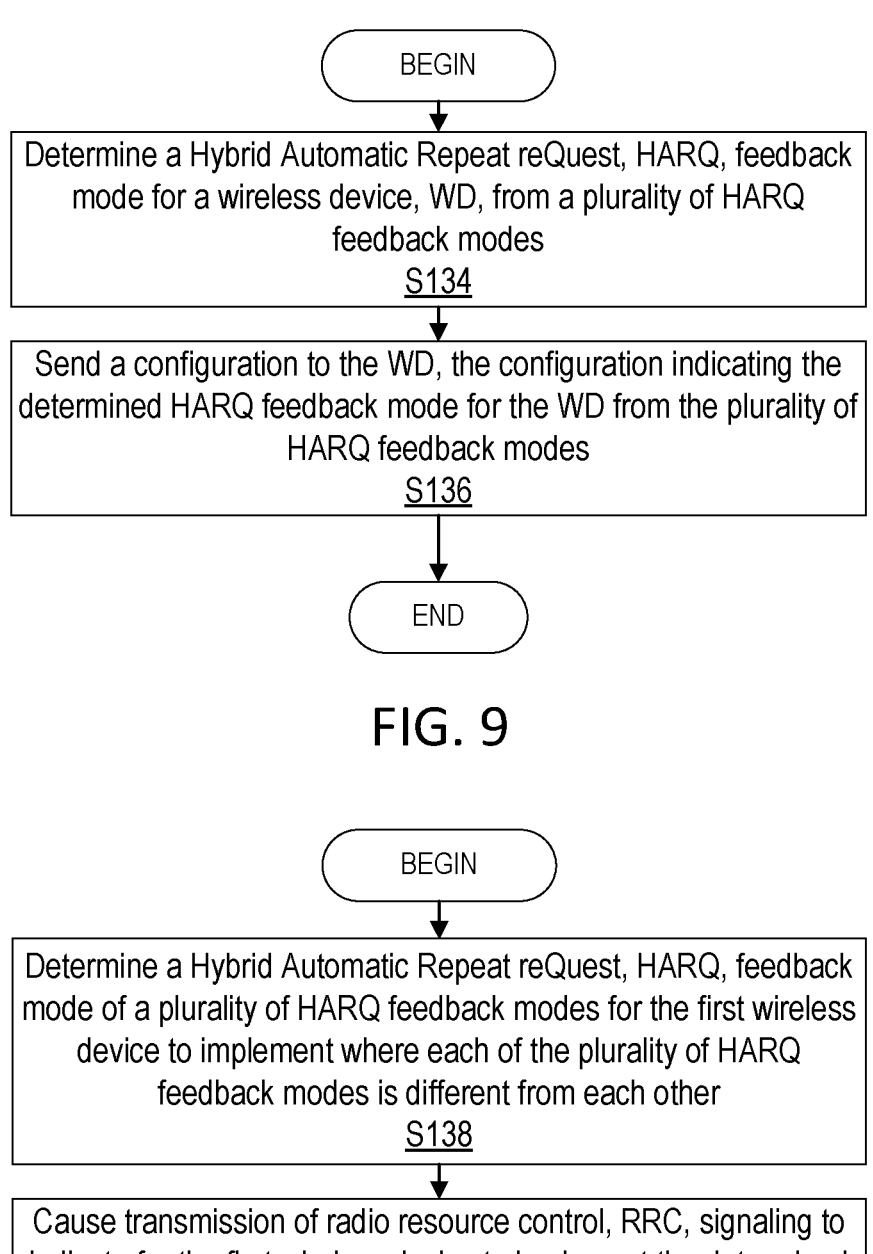
FIG. 9 is a flowchart of an example process in a network node according to some embodiments of the present disclosure.
FIG. 10 is a flowchart of another example process in a network node according to some embodiments of the present disclosure.

FIG. 9 is a flowchart of an example process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, etc. according to the example method. The example method includes determining (Block S134), such as via configuration unit 32, processing circuitry 68, processor 70 and/or radio interface 62, a Hybrid Automatic Repeat reQuest, HARQ, feedback mode for a wireless device, WD from a plurality of HARQ feedback modes. The method includes sending (Block S136), such as via configuration unit 32, processing circuitry 68, processor 70 and/or radio interface 62, a configuration to the WD, the configuration indicating the determined HARQ feedback mode for the WD from the plurality of HARQ feedback modes.

In some embodiments, a first HARQ feedback mode of the plurality of HARQ feedback modes enables at least one of an acknowledgement, ACK, and a non-acknowledgment, NACK, and a second HARQ feedback mode of the plurality of HARQ feedback modes disables the at least one of the ACK and NACK. In some embodiments, the method further includes determining, such as via configuration unit 32, processing circuitry 68, processor 70 and/or radio interface 62, a first number of WDs to configure with a first HARQ feedback mode and a second number of WDs to configure with a second HARQ feedback mode based on an amount of physical uplink control channel, PUCCH, resources configured by the network node.

In some embodiments, the method further includes sending, such as via configuration unit 32, processing circuitry 68, processor 70 and/or radio interface 62, a second configuration to the WD, the second configuration indicating a second HARQ feedback mode for the WD. In some embodiments, the method further includes sending, such as via configuration unit 32, processing circuitry 68, processor 70 and/or radio interface 62, a multicast physical downlink shared channel, PDSCH, to at least the WD; and receiving, such as via configuration unit 32, processing circuitry 68, processor 70 and/or radio interface 62, a HARQ feedback on a physical uplink control channel, PUCCH, resource, the PUCCH resource on which the HARQ feedback is received being based on the HARQ feedback mode configured to the WD.

FIG. 10 is a flowchart of an example process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, etc. according to the example method. The example method includes determining (Block S138), by the network node 16, a Hybrid Automatic Repeat reQuest, HARQ, feedback mode of a plurality of HARQ feedback modes for the first wireless device 22 to implement where each of the plurality of HARQ feedback modes are different from each other, as described herein. The example method includes causing (Block S140), by the network node 16, transmission of radio resource control, RRC, signaling to indicate for the first wireless device 22 to implement the determined HARQ feedback mode of the plurality of feedback modes, as described herein.

According to one or more embodiments, the plurality of HARQ feedback modes include a first HARQ feedback mode that enables at least one of an acknowledgement, ACK, and a non-acknowledgment, NACK, and a second HARQ feedback mode that disables one of the ACK and NACK. According to one or more embodiments, the plurality of HARQ feedback modes include a third HARQ feedback mode that disables both the ACK and NACK. According to one or more embodiments, the processing circuitry 68 is further configured to cause transmission to a plurality of point-to-multipoint, PTM, groups, a first PTM group and a second PTM group of the plurality of PTM groups being associated with the first wireless device 22, and where the RRC signaling indicates that the determined HARQ feedback mode for the first wireless device 22 is to be implemented by the first wireless device 22 for the first PTM group and not the second PTM group.

According to one or more embodiments, each PTM group of the plurality of PTM groups are associated with a different group-radio network temporary identifier, G-RNTI. According to one or more embodiments, the network node is further configured to communicate with a plurality of wireless devices 22 that include the first wireless device 22. The processing circuitry 68 is configured to cause transmission to a plurality of point-to-multipoint, PTM, groups associated with the plurality of wireless devices 22, and where the RRC signaling indicates for a subset of the plurality of wireless device 22 to implement the determined HARQ feedback mode of the plurality of feedback modes. According to one or more embodiments, the determined HARQ feedback mode of the plurality of HARQ feedback modes disables a non-acknowledgement, NACK, and enables an acknowledgement, ACK.

According to one or more embodiments, the network node 16 is further configured to communicate with a plurality of wireless devices 22 that include the first wireless device 22. The processing circuitry 68 is further configured to determine a quantity of the plurality of wireless devices 22 that are configured with a physical uplink control channel, PUCCH, configuration on a first time-frequency resource for transmitting HARQ feedback, determine whether the determined quantity of the plurality of wireless devices 22 exceeds a threshold, and reconfigure a subset of the plurality of wireless devices 22 with a PUCCH configuration on a second time-frequency resource different from the first time-frequency resource. According to one or more embodiments, the RRC signaling is sent via downlink control information, DCI. According to one or more embodiments, the processing circuitry is further configured to cause transmission of a multicast physical downlink shared channel, PDSCH, to at least the first wireless device 22, and receive HARQ feedback on a first physical uplink control channel, PUCCH, resource of a plurality of PUCCH resources where the first PUCCH resource on which the HARQ feedback is received is based on the determined HARQ feedback mode.

Figures 11, 12:
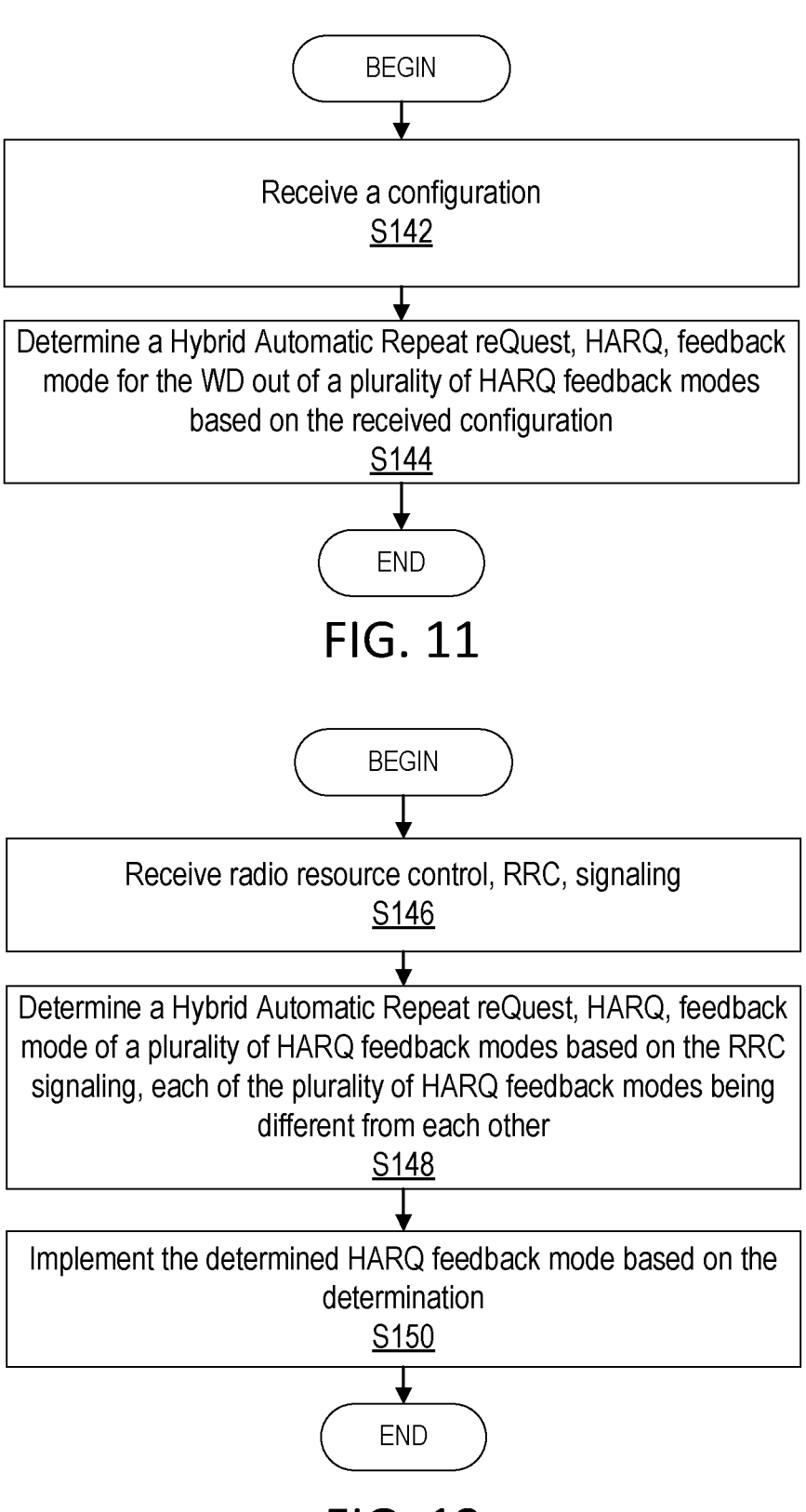
FIG. 11 is a flowchart of an example process in a wireless device according to some embodiments of the present disclosure.
FIG. 12 is a flowchart of another example process in a wireless device according to some embodiments of the present disclosure.

FIG. 11 is a flowchart of an example process in a wireless device 22 according to some embodiments of the present disclosure. One or more Blocks and/or functions and/or methods performed by WD 22 may be performed by one or more elements of WD 22 such as by determination unit 34 in processing circuitry 84, processor 86, radio interface 82, etc. The example method includes receiving (Block S142), such as via determination unit 34, processing circuitry 84, processor 86 and/or radio interface 82, a configuration. The method includes determining (Block S144), such as via determination unit 34, processing circuitry 84, processor 86 and/or radio interface 82, a Hybrid Automatic Repeat reQuest, HARQ, feedback mode for the WD from a plurality of HARQ feedback modes based on the received configuration.

In some embodiments, a first HARQ feedback mode of the plurality of HARQ feedback modes enables at least one of an acknowledgement, ACK, and a non-acknowledgment, NACK, and a second HARQ feedback mode of the plurality of HARQ feedback modes disables the at least one of the ACK and NACK. In some embodiments, a first number of WDs configured with a first HARQ feedback mode and a second number of WDs configured with a second HARQ feedback mode, the first and second number being based on an amount of physical uplink control channel, PUCCH, resources configured by a network node.

In some embodiments, the method further includes receiving, such as via determination unit 34, processing circuitry 84, processor 86 and/or radio interface 82, a second configuration, the second configuration indicating a second HARQ feedback mode for the WD. In some embodiments, the method further includes receiving, such as via determination unit 34, processing circuitry 84, processor 86 and/or radio interface 82, a multicast physical downlink shared channel, PDSCH; and sending, such as via determination unit 34, processing circuitry 84, processor 86 and/or radio interface 82, a HARQ feedback on a physical uplink control channel, PUCCH, resource, the PUCCH resource on which the HARQ feedback is received being based on the HARQ feedback mode configured to the WD.

FIG. 12 is another flowchart of an example process in a wireless device 22 according to some embodiments of the present disclosure. One or more Blocks and/or functions and/or methods performed by WD 22 may be performed by one or more elements of WD 22 such as by determination unit 34 in processing circuitry 84, processor 86, radio interface 82, etc. The example method includes receiving (Block S146), by wireless device 22, radio resource control, RRC, signaling, as described herein. The example method further includes determining (Block S148) a Hybrid Automatic Repeat reQuest, HARQ, feedback mode of a plurality of HARQ feedback modes based on the RRC signaling where each of the plurality of HARQ feedback modes is different from each other, as described herein. The example method further includes implementing (Block S150) the determined HARQ feedback mode based on the determination, as described herein.

According to one or more embodiments, the plurality of HARQ feedback modes include a first HARQ feedback mode that enables at least one of an acknowledgement, ACK, and a non-acknowledgment, NACK, and a second HARQ feedback mode that disables one of the ACK and NACK. According to one or more embodiments, the plurality of HARQ feedback modes include a third HARQ feedback mode that disables both the ACK and NACK. According to one or more embodiments, the first wireless device is registered with first and second point-to-multipoint, PTM, groups of a plurality of PTM groups, where the RRC signaling indicates that the determined HARQ feedback mode of the plurality of HARQ feedback modes for the first wireless device is to be implemented for the first PTM group and not for a second PTM group.

According to one or more embodiments, each PTM group of the plurality of PTM groups are associated with a different group-radio network temporary identifier, G-RNTI. According to one or more embodiments, the RRC signaling is associated with a subset of a plurality of wireless devices 22 that includes the first wireless device 22 where the RRC signaling indicates for the subset of the plurality of wireless devices 22 to implement the determined HARQ feedback mode. According to one or more embodiments, the determined HARQ feedback mode of the plurality of HARQ feedback modes disables a non-acknowledgement, NACK, and enables an acknowledgement, ACK.

According to one or more embodiments, the RRC signaling is received via downlink control information, DCI. According to one or more embodiments, the processing circuitry 84 is further configured to receive a multicast physical downlink shared channel, PDSCH, and cause transmission of HARQ feedback on a first physical uplink control channel, PUCCH, resource of a plurality of PUCCH resources where the first PUCCH resource on which the HARQ feedback is received is based on the determined HARQ feedback mode.

Having described the general process flow of arrangements of the disclosure and having provided examples of hardware and software arrangements for implementing the processes and functions of the disclosure, the sections below provide details and examples of arrangements for HARQ feedback en-/disabling for multicast such as enabling/disabling one or more HARQ feedback modes for one or more wireless devices 22, which may be implemented by the network node 16, wireless device 22 and/or host computer 24. One or more network node 16 functions described below may be performed/implemented by one or more of processing circuitry 68, configuration unit 32, processor 70, radio interface 62, etc. One or more wireless device 22 functions described herein may be performed/implemented by one or more of processing circuitry 84, processor 86, determination unit 34, radio interface 82, etc.

Some embodiments of the present disclosure may include one or more of:

The network node 16 dynamically configuring WDs 22 via RRC reconfiguration with changes of the HARQ feedback mode to use, i.e., A/N, NACK-only or no feedback. In some embodiments, most of the time, all (or at least a substantial amount of) PUCCH resources may be exploited: however, when a WD 22 in NACK-only mode is to be transferred to A/N mode, another WD 22 is first transferred from A/N mode to NACK-only mode in order to release the required PUCCH resource. Since the WD 22 in NACK-only mode can transmit NACKs there is no urgency in moving this WD 22 to A/N, so there is no need to keep an empty PUCCH resource available for instant use.

A medium access control (MAC) control element (CE) being used (e.g., transmitted by the network node 16 to WDs 22) to enable/disable HARQ-ACK for individual WDs 22. In some embodiments, when MAC CE is used to inform the WD 22 of which PUCCH resource to use or no PUCCH to use, PRI in DCI is obsolete.

Disabled mode implying either NACK-only feedback or no HARQ feedback.

The network node 16 keeping at least one (or more) PUCCH resources "empty" to be instantly ready to use for any WD 22 that has both A/N and NACK-only disabled and becomes enabled.

RRC reconfiguration by network node 16 of disabled WDs 22 being performed "in the background", so that all disabled WDs 22 have a limited selection of configured (candidate) PUCCH resources, e.g., at least one.

With MAC CE, a particular WD 22 is enabled, in some embodiments with a pointer to the actual resource to use in cases where more than one has been configured.

In parallel or at the next suitable opportunity, another WD 22 being disabled via MAC CE. The delay between enabling one WD 22 and disabling another WD 22 may not be critical as the prior RRC reconfiguration has ensured that it is possible to assign a free PUCCH resource to the newly enabled WD 22 without having to disable another WD 22 at the same time.

In some embodiments, MAC CEs are acknowledged by WDs 22, which may be beneficial in order to prevent that a WD 22 continues to transmit ACK/NACK on a PUCCH resource that the network node 16 will assume is freed up by the WD 22.

For PTM there can be one DCI scheduling the PDSCH for multiple WDs 22 that all are intended to subsequently transmit A/N for the PDSCH. The PUCCH configurations for these WDs 22 therefore may be selected by the network node 16 (e.g., gNB) in a way that the same PRI contained in the DCI points to a different PUCCH configuration for each WD 22.

In one embodiment of the present disclosure, the PUCCH configurations for all WDs 22 that currently have A/N disabled are identical for the same PRI and different from all PUCCH configurations for all WDs 22 that currently have A/N enabled. Such a PUCCH configuration may be regarded as a standby or default PUCCH configuration.

This way, in the event that a A/N-disabled WD 22 gets enabled via e.g., MAC CE, the WD 22 may transmit A/N on (e.g., a PUCCH resource in) the PUCCH configuration without colliding with the A/N transmitted by an already A/N enabled WD 22. The standby or default configurations may be useful for this purpose.

In one embodiment, the standby/default PUCCH configurations for all WDs 22 that currently have A/N disabled are identical for subsets of these WDs 22, for the same PRI and different from all PUCCH configurations for all WDs 22 that currently have A/N enabled.

In one embodiment, when the network node 16 (e.g., gNB) disables A/N for a WD 22, then afterwards the network node 16 (e.g., gNB) reconfigures the PUCCH configuration for that WD 22 to one of the standby/default PUCCHs configurations.

In one embodiment, the network node 16 (e.g., gNB) configures for each WD 22 a PUCCH configuration for NACK-only to be used when the WD 22 is A/N disabled. The PUCCH configuration for NACK-only may be the same for all PRI, but in general may be different, thereby retaining the purpose of the PRI of dynamically addressing of (e.g., PUCCH resources and/or PUCCH resource sets in) PUCCH configurations.

In one embodiment, the MAC CEs are not WD-specific but are group-specific, i.e., transmitted in a group PDSCH scrambled by group-radio network temporary identifier (G-RNTI). The group MAC CEs may, for example, include IDs of all WDs 22 of the group for which it contains information, and one or more of the respective information discussed above.

In one embodiment, the WD 22 is preconfigured/predefined with one or more PUCCH configurations to be used while in a NACK-only or in disabled mode as well as a one or more PUCCH configurations to be used when the WD 22 is in A/N enabled mode. In one embodiment, PUCCH resource set IDs can be associated in one of two lists, associating the PUCCH resource sets to apply to either NACK-only or disabled mode, respectively, or the A/N enabled mode of feedback.

In one embodiment, the PRI field may be interpreted by the WD 22 differently based on the way the WD 22 HARQ feedback is configured (e.g., by the network node 16), for example:

In one embodiment, the PRI field in DCI only applies when the WD 22 HARQ feedback configuration is configured as A/N enabled, and is discarded or ignored by the WD 22 when the WD 22 is configured in NACK-only or disabled and NACK-only disabled mode.

In one embodiment, the meaning of the PRI field in DCI is further configured with an additional RRC configuration parameter, e.g., "ACK_NACK_state". The state of this parameter may be modified via RRC configuration or RRC re-configuration or a dedicated MAC CE (e.g., transmitted by the network node 16). In some embodiments, when the state of the parameter is set to NACK-only or disabled, the WD 22 interprets the PRI to point at the resources in PUCCH resource sets associated with the so called NACK-only or standby mode, respectively, PUCCH resource sets mentioned above. When the "ACK_NACK_state" is set to enabled, then the WD 22 interprets the PRI to point at the resources in PUCCH resource sets associated with the other PUCCH resource sets.

In one embodiment, the reconfiguration of the WD 22 state of HARQ ACK between "disabled/NACK only" and "enable HARQ ACK" is configured by a MAC CE message. The MAC CE message may include a field to update the WD 22 HARQ ACK state. Additionally, the MAC CE may also include a pointer to PUCCH resources to be used in conjunction with the new WD 22 state. For example, if the WD 22 is reconfigured to "enabled" the pointer configures the resource set exclusive to the WD 22 to send HARQ-ACK. In another example, the MAC CE PUCCH resource pointer could be used to direct the WD 22 to use one of several pools of PUCCH standby resources in disabled mode.

In one embodiment, the PUCCH resource for PTM are not addressed dynamically by a PRI in the DCI, but the PRI is indicated to each PTM WD 22 in a WD 22 specific MAC CE. The PRI field in the DCI is then not used (e.g., ignored by the WD 22).

Assuming the PRI value is in the range [0, MAX], MAX could mean No HARQ feedback at all. In some embodiments, MAX−1 link to a PUCCH resource which is for NACK only based HARQ feedback. Other PRI values may link to PUCCH resources for ACK/NACK based HARQ feedback.

In one embodiment, the MAC CE is for multiple group WDs 22, i.e., it is transmitted in a group PDSCH scrambled by a G-RNTI. The MAC CE may contain WD ID and the PRI that this WD ID should apply. The MAC CE could look as below, for example:

```
WD ID 1
PUCCH resource indicator 1
WD ID 2
PUCCH resource indicator 2 . . .
WD ID i (where i can be any number)
PUCCH resource indicator i
```

In some embodiments, the WD ID 1 could be a WD disabled to send HARQ feedback anymore, therefore its PRI could be e.g., MAX. WD ID 2 could be a WD 22 that is enabled to send HARQ feedback now, therefore its PRI could be 'n' which was used by WD ID 1 before.

WD 22 may send HARQ ACK to confirm this change. WD ID 1 can still use its originally allocated PUCCH resource 'n' to ACK this action in slot 's' which is according to the HARQ feedback timing in DCI/PDCCH. WD ID 2 may use PUCCH resource 'n' to ACK this action as well but in slot 's'+1.

That is, in some embodiments, for those WDs 22 that are disabled to send HARQ feedback, they can use the original PUCCH resource to send HARQ feedback according to PDSCH-to-HARQ_feedback timing indicator in DCI. For those WD 22 that are enabled to send HARQ feedback, they can use the same PUCCH resource to send HARQ feedback but in one slot later.

In one embodiment, the network node 16 configures the same NACK-only PUCCH configurations for a subset of WDs 22 from the PTM-group of WDs 22.

In one embodiment, if the number of WDs 22 configured with PUCCH configurations on the same time-frequency resource exceeds a threshold (e.g., predefined or configured threshold), then the network node 16 reconfigures the excess WDs 22 to a new PUCCH configuration on a new time-frequency resource, in order to e.g., limit the power aggregation when all WDs 22 with the same PUCCH configuration transmit NACK.

In one embodiment, the MAC CE containing the command to disable A/N also contains the command to enable NACK-only.

In one embodiment, the enabling/disabling of A/N (e.g., by network node 16) for a WD 22 can be separate for each PTM group that the WD 22 is registered to, i.e., per PDSCH scrambled with a different G-RNTI.

In one embodiment, the PUCCH configurations for a WD 22 can be group specific. In another embodiment, the PUCCH configurations can be common for all groups.

In one embodiment, there may be different combinations of RRC configuration/reconfiguration and MAC CE messages that are used for the signalling of the items/information discussed above. In one embodiment, everything is done via RRC reconfiguration by the network node 16. In another embodiment, all PUCCH (re-)configuration for WDs 22 are done via MAC CE transmitted by the network node 16, based on e.g., some more static RRC configuration. In one embodiment, the RRC-based reconfiguration may also be combined with enable/disable messages via MAC CE.

Some embodiments of the present disclosure may include one or more of the following:

The network node 16 dynamically (e.g., via DCI) enables/disables HARQ A/N of individual WDs 22.

RRC reconfiguration is used to dynamically enable and configure HARQ-ACK for individual WDs 22. WDs 22 are disabled via RRC reconfiguration or (preferably) via MAC CE.

Alternatively, MAC CE is used to enable/disable HARQ-ACK for individual WDs 22.

Disabled mode could imply either NACK-only feedback or no HARQ feedback at all.

The network node 16 may keep at least one PUCCH resource "empty" to be instantly ready to use for any disabled WD 22 that becomes enabled.

RRC reconfiguration of disabled WDs 22 may be performed "in the background", so that all disabled WDs 22 have a limited selection of configured (candidate) PUCCH resources, at least one, for example.

With MAC CE, a particular WD 22 is enabled, possibly with a pointer to the actual resource to use in case more than one has been configured.

In parallel or at the next suitable opportunity, another WD 22 is disabled via MAC CE. The delay between enabling one and disabling another WD 22 may not be an issue, as the prior RRC reconfiguration has ensured that it is possible to assign a free PUCCH resource to the newly enabled WD 22 without having to disable another WD 22 at the same time.

SOME EXAMPLES

1. A method implemented in a network node 16, the method comprising:

determining a Hybrid Automatic Repeat reQuest, HARQ, feedback mode for a wireless device, WD 22 from a plurality of HARQ feedback modes; and sending a configuration to the WD 22, the configuration indicating the determined HARQ feedback mode for the WD 22 from the plurality of HARQ feedback modes.

2. The method of Example 1, wherein a first HARQ feedback mode of the plurality of HARQ feedback modes enables at least one of an acknowledgement, ACK, and a non-acknowledgment, NACK, and a second HARQ feedback mode of the plurality of HARQ feedback modes disables the at least one of the ACK and NACK.

3. The method of any one of Examples 1 and 2, further comprising:

determining a first number of WDs 22 to configure with a first HARQ feedback mode and a second number of WDs 22 to configure with a second HARQ feedback mode based on an amount of physical uplink control channel, PUCCH, resources configured by the network node 16.

4. The method of any one of Examples 1-3, further comprising:

sending a second configuration to the WD 22, the second configuration indicating a second HARQ feedback mode for the WD 22.

5. The method of any one of Examples 1-4, further comprising:

sending a multicast physical downlink shared channel, PDSCH, to at least the WD 22; and receiving a HARQ feedback on a physical uplink control channel, PUCCH, resource, the PUCCH resource on which the HARQ feedback is received being based on the HARQ feedback mode configured to the WD 22.

6. A method implemented in a wireless device, WD 22, the method comprising:

receiving a configuration; and determining a Hybrid Automatic Repeat reQuest, HARQ, feedback mode for the WD 22 from a plurality of HARQ feedback modes based on the received configuration.

7. The method of Example 6, wherein a first HARQ feedback mode of the plurality of HARQ feedback modes enables at least one of an acknowledgement, ACK, and a non-acknowledgment, NACK, and a second HARQ feedback mode of the plurality of HARQ feedback modes disables the at least one of the ACK and NACK.

8. The method of any one of Examples 6 and 7, wherein a first number of WDs 22 configured with a first HARQ feedback mode and a second number of WDs 22 configured with a second HARQ feedback mode, the first and second number being based on an amount of physical uplink control channel, PUCCH, resources configured by a network node 16.

9 The method of any one of Examples 6-8, further comprising:

receiving a second configuration, the second configuration indicating a second HARQ feedback mode for the WD 22.

10. The method of any one of Examples 6-9, further comprising:

receiving a multicast physical downlink shared channel, PDSCH; and sending a HARQ feedback on a physical uplink control channel, PUCCH, resource, the PUCCH resource on which the HARQ feedback is received being based on the HARQ feedback mode configured to the WD 22.

11. A network node 16 configured to communicate with a wireless device, WD 22, the network node 16 configured to, and/or comprising a radio interface and/or comprising processing circuitry configured to:

determine a Hybrid Automatic Repeat reQuest, HARQ, feedback mode for a wireless device, WD 22 from a plurality of HARQ feedback modes; and send a configuration to the WD 22, the configuration indicating the determined HARQ feedback mode for the WD 22 from the plurality of HARQ feedback modes.

12. The network node 16 of Example 11, wherein a first HARQ feedback mode of the plurality of HARQ feedback modes enables at least one of an acknowledgement, ACK, and a non-acknowledgment, NACK, and a second HARQ feedback mode of the plurality of HARQ feedback modes disables the at least one of the ACK and NACK.

13. The network node 16 of any one of Examples 11 and 12, wherein the network node 16 and/or the radio interface and/or the processing circuitry is configured to:

determine a first number of WDs 22 to configure with a first HARQ feedback mode and a second number of WDs 22 to configure with a second HARQ feedback mode based on an amount of physical uplink control channel, PUCCH, resources configured by the network node 16.

14. The network node 16 of any one of Examples 11-13, wherein the network node 16 and/or the radio interface and/or the processing circuitry is configured to:

send a second configuration to the WD 22, the second configuration indicating a second HARQ feedback mode for the WD 22.

15. The network node 16 of any one of Examples 11-14, wherein the network node 16 and/or the radio interface and/or the processing circuitry is configured to:

send a multicast physical downlink shared channel, PDSCH, to at least the WD 22; and receive a HARQ feedback on a physical uplink control channel, PUCCH, resource, the PUCCH resource on which the HARQ feedback is received being based on the HARQ feedback mode configured to the WD 22.

16. A wireless device, WD 22, configured to communicate with a network node 16, the WD 22 configured to, and/or comprising a radio interface and/or processing circuitry configured to:

receive a configuration; and determine a Hybrid Automatic Repeat reQuest, HARQ, feedback mode for the WD 22 from a plurality of HARQ feedback modes based on the received configuration.

17. The WD 22 of Example 16, wherein a first HARQ feedback mode of the plurality of HARQ feedback modes enables at least one of an acknowledgement, ACK, and a non-acknowledgment, NACK, and a second HARQ feedback mode of the plurality of HARQ feedback modes disables the at least one of the ACK and NACK.

18. The WD 22 of any one of Examples 16 and 17, wherein a first number of WDs 22 configured with a first HARQ feedback mode and a second number of WDs 22 configured with a second HARQ feedback mode, the first and second number being based on an amount of physical uplink control channel, PUCCH, resources configured by a network node 16.

19. The WD 22 of any one of Examples 16-18, wherein the WD 22 and/or the radio interface and/or the processing circuitry is configured to:

receive a second configuration, the second configuration indicating a second HARQ feedback mode for the WD 22.

20. The WD 22 of any one of Examples 16-19, wherein the WD 22 and/or the radio interface and/or the processing circuitry is configured to:

receive a multicast physical downlink shared channel, PDSCH; and send a HARQ feedback on a physical uplink control channel, PUCCH, resource, the PUCCH resource on which the HARQ feedback is received being based on the HARQ feedback mode configured to the WD 22.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| PRI | PUCCH Resource Indicator |
| UCI | Uplink Control Information |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a plurality of wireless devices comprising a first wireless device, the network node comprising processing circuitry configured to:

determine a Hybrid Automatic Repeat reQuest, HARQ, feedback mode of a plurality of HARQ feedback modes for the first wireless device to implement, each of the plurality of HARQ feedback modes being different from each other;

cause transmission of radio resource control, RRC, signaling to indicate for the first wireless device to implement the determined HARQ feedback mode of the plurality of feedback modes;

determine a quantity of the plurality of wireless devices that are configured with a physical uplink control channel, PUCCH, configuration on a first time-frequency resource for transmitting HARQ feedback;

determine whether the determined quantity of the plurality of wireless devices exceeds a threshold; and reconfigure a subset of the plurality of wireless devices with a PUCCH configuration on a second time-frequency resource different from the first time-frequency resource.

2. The network node of claim 1, wherein the plurality of HARQ feedback modes include:

a first HARQ feedback mode that enables at least one of an acknowledgement, CK, and a non-acknowledgment, NACK; and a second HARQ feedback mode that disables one of the ACK and NACK.

3. The network node of claim 2, wherein the plurality of HARQ feedback modes include a third HARQ feedback mode that disables both the ACK and NACK.

4. The network node of claim 1, wherein the processing circuitry is further configured to cause transmission to a plurality of point-to-multipoint, PTM, groups, a first PTM group and a second PTM group of the plurality of PTM groups being associated with the first wireless device; and the RRC signaling indicating that the determined HARQ feedback mode for the first wireless device is to be implemented by the first wireless device for the first PTM group and not the second PTM group.

5. The network node of claim 4, wherein each PTM group of the plurality of PTM groups are associated with a different group-radio network temporary identifier, G-RNTI.

6. The network node of claim 1, wherein the network node is further configured to communicate with a plurality of wireless devices that include the first wireless device; and the processing circuitry is configured to cause transmission to a plurality of point-to-multipoint, PTM, groups associated with the plurality of wireless devices; and the RRC signaling indicating for a subset of the plurality of wireless device to implement the determined HARQ feedback mode of the plurality of feedback modes.

7. The network node of claim 1, wherein the RRC signaling is sent via downlink control information, DCI.

8. The network node of claim 1, wherein the processing circuitry is further configured to:

cause transmission of a multicast physical downlink shared channel, PDSCH, to at least the first wireless device; and receive HARQ feedback on a first physical uplink control channel, PUCCH, resource of a plurality of PUCCH resources, the first PUCCH resource on which the HARQ feedback is received being based on the determined HARQ feedback mode.

9. A method implemented by a network node configured to communicate with a plurality of wireless devices comprising a first wireless device, the method comprising:

determining a Hybrid Automatic Repeat reQuest, HARQ, feedback mode of a plurality of HARQ feedback modes for the first wireless device to implement, each of the plurality of HARQ feedback modes being different from each other;

causing transmission of radio resource control, RRC, signaling to indicate for the first wireless device to implement the determined HARQ feedback mode of the plurality of feedback modes;

determining a quantity of the plurality of wireless devices that are configured with a physical uplink control channel, PUCCH, configuration on a first time-frequency resource for transmitting HARQ feedback;

determining whether the determined quantity of the plurality of wireless devices exceeds a threshold; and reconfiguring a subset of the plurality of wireless devices with a PUCCH configuration on a second time-frequency resource different from the first time-frequency resource.

10. The method of claim 9, wherein the plurality of HARQ feedback modes include:

a first HARQ feedback mode that enables at least one of an acknowledgement, ACK, and a non-acknowledgment, NACK; and a second HARQ feedback mode that disables one of the ACK and NACK.

11. The method of claim 10, wherein the plurality of HARQ feedback modes include a third HARQ feedback mode that disables both the ACK and NACK.

12. The method of claim 9, further comprising causing transmission to a plurality of point-to-multipoint, PTM, groups, a first PTM group and a second PTM group of the plurality of PTM groups being associated with the first wireless device; and the RRC signaling indicating that the determined HARQ feedback mode for the first wireless device is to be implemented by the first wireless device for the first PTM group and not the second PTM group.

13. The method of claim 12, wherein each PTM group of the plurality of PTM groups are associated with a different group-radio network temporary identifier, G-RNTI.

14. The method of claim 9, wherein the network node is further configured to communicate with a plurality of wireless devices that include the first wireless device; and the method further comprising causing transmission to a plurality of point-to-multipoint, PTM, groups associated with the plurality of wireless devices; and the RRC signaling indicating for a subset of the plurality of wireless device to implement the determined HARQ feedback mode of the plurality of feedback modes.

15. The method of claim 9, wherein the RRC signaling is sent via downlink control information, DCI.

16. The method of claim 9, further comprising:

causing transmission of a multicast physical downlink shared channel, PDSCH, to at least the first wireless device; and receiving HARQ feedback on a first physical uplink control channel, PUCCH, resource of a plurality of PUCCH resources, the first PUCCH resource on which the HARQ feedback is received being based on the determined HARQ feedback mode.

* * * * *